(No Model.)  
2 Sheets—Sheet 2.
A. W. BROWNE.
DENTAL ENGINE.
No. 503,737.  
Patented Aug. 22, 1893.
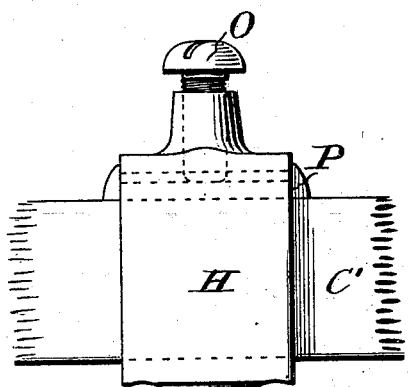
FIG. 4.
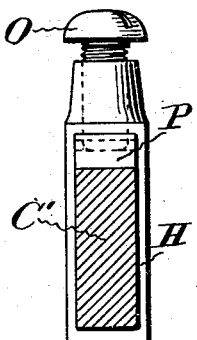
FIG. 5.
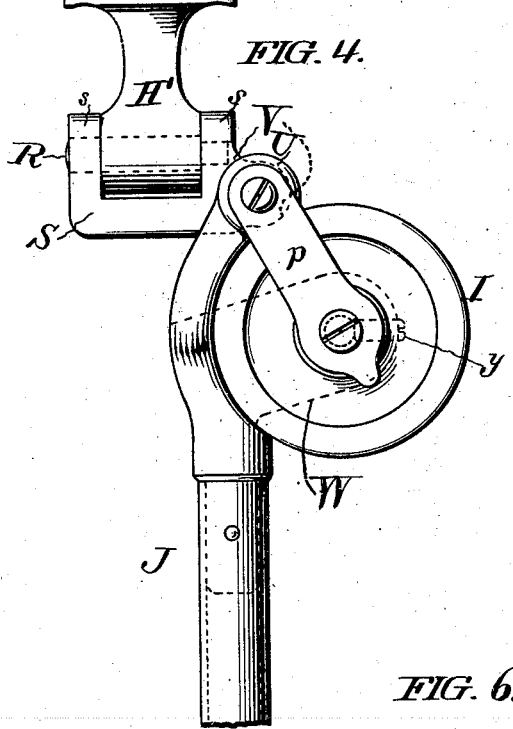
FIG. 6.
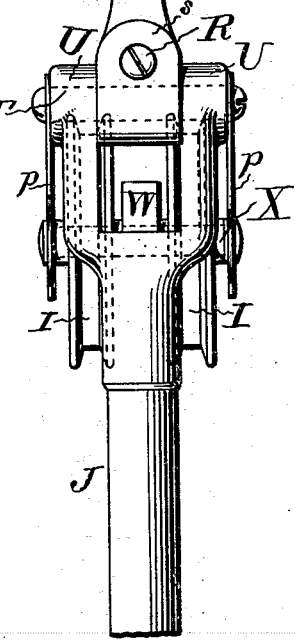
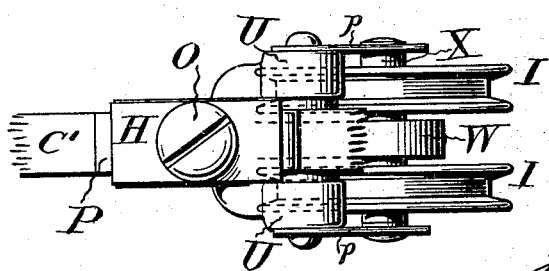
WITNESSES  
Edw. F. Simpson Jr.  
Bernard Hodges
INVENTOR  
A. W. Browne  
By atty

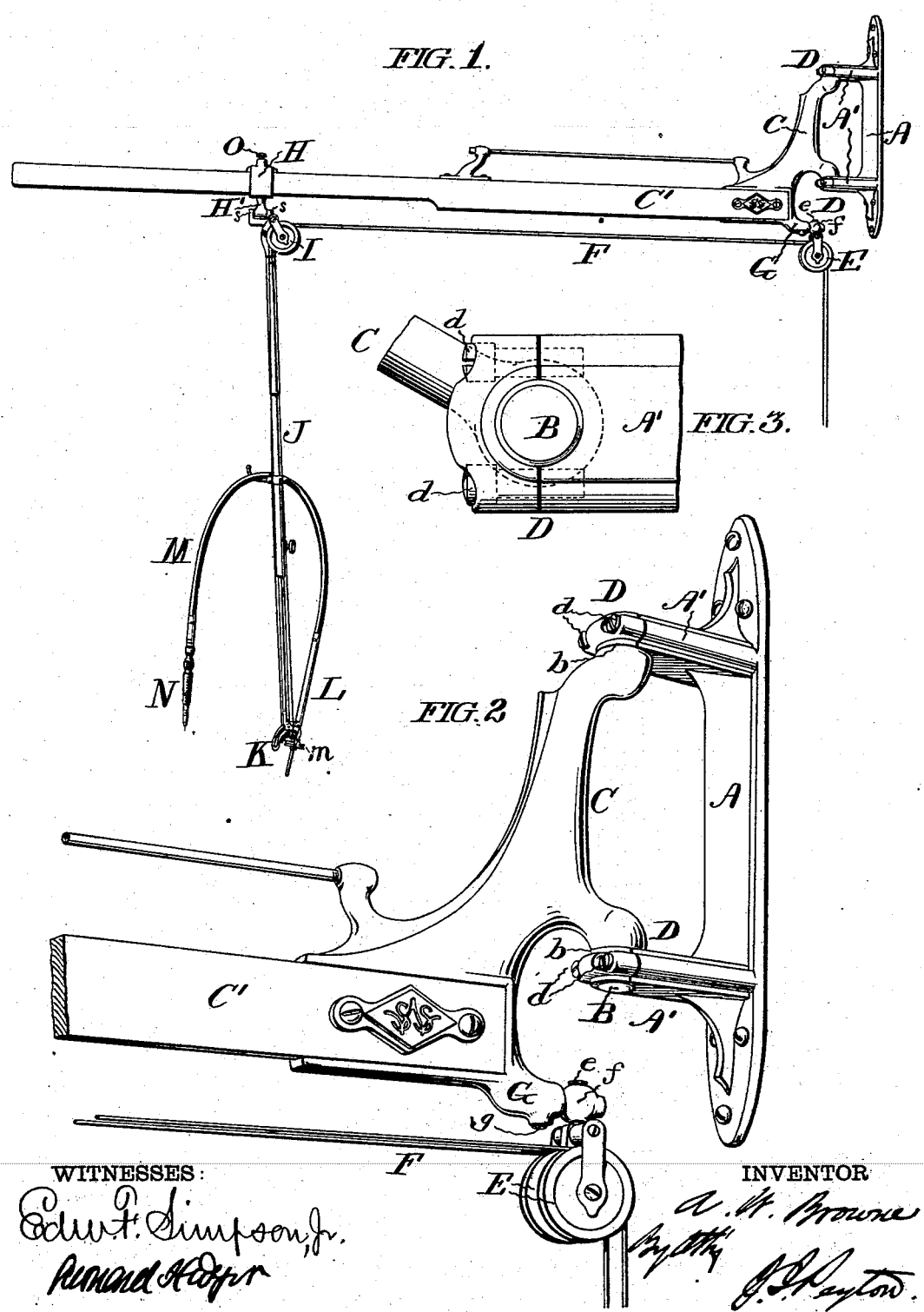

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

DENTAL ENGINE.

SPECIFICATION forming part of Letters Patent No. 503,737, dated August 22, 1893.

Application filed April 29, 1893. Serial No. 472,289. (No model.)

*To all whom it may concern:*

Be it known that I, ARTHUR W. BROWNE, a citizen of the United States, residing at Prince's Bay, in the county of Richmond and State of New York, have invented certain new and useful Improvements in Dental Engines; and I do hereby declare the following to be a full, clear, and exact description of the invention, such as will enable others skilled in the art to which it appertains to make and use the same.

My invention relates to certain improvements, as hereinafter specifically claimed, applicable to that class of dental engines usually known as suspension engines.

In the accompanying drawings which show a suitable embodiment of my improvements in a suspension dental engine of the wall bracket type, Figure 1 is a view in elevation on a considerably reduced scale as compared with the other figures. Fig. 2 is a view in perspective showing portions of the bracket, with the cord guide pulleys at the inner end thereof. Fig. 3 is a plan view showing details of the connection between the bracket arm and the wall plate to which it is jointed. Figs. 4 and 5 are views in elevation at right angles with each other showing the manner of supporting a jointed swinging arm of the engine, and the outer cord guide pulleys by the bracket arm; and Fig. 6 is a top view of parts shown in Figs. 4 and 5.

The bracket support or wall plate A, rigidly attached in suitable position as usual, is provided with two horizontally projecting arms A' A' which at their outer ends are provided with bearings for the upper and lower journals B B of the carrier portion C of a suitable swinging bracket arm C'. Each of the bearings D D for the bracket arm is divided, the outer removable section or cap of each divided bearing being attached by screws d d to the arm A' in which the other section of the bearing is formed. The shoulders b b at the terminations of the respective journals B B prevent vertical movement of the bracket arm which may be swung horizontally.

A pulley block having a pair of guide pulleys E E for the driving cord F which is actuated in any suitable and usual way, is suitably mounted so as to be capable of swiveling movement at the inner end of the bracket arm beneath and in line with the journal bearings which provide for the swinging movement of the bracket arm. The swiveling pulley block is connected with the bracket arm by means of the carrier portion C of the bracket arm which is provided with a support G with which engages the shank of a socket piece *f* free to turn in the carrier arm but kept from endwise movement by a set screw *g* in suitable way. The shank *e* of the pulley block is adapted to turn in the socket piece *f*.

It will be seen that the swinging movements of the bracket arm do not alter the relative positions of its journals and the pulley block; that consequently there is no variation in the distance between the guide pulleys E E and the cord driving device or point of support from which the cord passes to these pulleys; that the free turning movement allowed the pulley block makes it self-adjusting to suit swinging movements of the bracket and prevent twisting of the driving cord, and adapts it to adjust itself into suitable inclined position to properly receive the driving cord in event of its passing to the pulleys at varying angles instead of vertically as shown; that by dividing the bracket arm bearings and providing for adjusting the outer or cap sections of these bearings, the bracket arm may be allowed to swing freely, and by proper adjustment of the cap sections of the bearings by the screws d d the free swinging movement of the bracket arm may be prevented, and a yielding frictional resistance produced between the bearings and bracket arm journals sufficient to hold the bracket against swinging unless force is applied greater than that to which it is subjected under ordinary operations of the apparatus.

An adjustable supporter H carried by the bracket arm carries a pulley block with cord guide pulleys I I, and a swinging pendent engine-arm J made in the telescoping sections. This arm J is provided at its outer end with a pulley head K carrying the stiff section L of a flexible shaft M provided with the driven pulley *m* and by way of which a suitable tool carried by the hand-piece N is actuated in usual well known way. The adjustable supporter is fitted to slide along the bracket arm to increase or lessen the range of movement of the hand-piece. A suitable clamping device for holding the supporter in the desired position consists, as shown, of a set screw O and bearing block or shoe P operating as will readily be understood. To impart free swinging movement to the pendent engine arm and guide pulleys I I in any direction in which it may be desirable to move them the arm and pulleys have doubly-jointed connection with the supporter in such manner that they may be rocked vertically about two points the one at a right angle with the other. The jointed connection is provided in the following way:—
The hanger portion or downwardly projecting arm H' of the adjustable supporter is embraced by the forks s s of a supporter attachment S and a pivot pin R passes through the attachment forks and through the hanger arm H' of the supporter. A pivot pin T at a right angle with the pivot R, passes through forks U U in which the upper end of the pendent engine arm terminates, and through a lug or short arm V of the attachment S. Cord guides p p, not herein claimed, are secured in place by screws. The pulleys I I are secured to a side projection or lug W of the engine arm by a bolt or pin X about which the pulleys rotate and which is secured by a set screw y so as to be rigid with the engine arm.

I claim as my invention—

1. The combination of the bracket supporting plate having the arms carrying the divided bearings, the bracket arm provided with journals received in said bearings, and the adjusting screws by which the outer or cap sections of the divided bearings may be caused to produce yielding frictional resistance to the swinging movement of the bracket arm, substantially as set forth.

2. The combination of the bracket supporting plate provided with bearings, the swinging bracket arm provided with journals received in said bearings and with a support for cord guide pulleys, the swiveling pulley block, and the cord guide pulley carried thereby and connected by the swiveling pulley block with their support on the bracket arm beneath and in line with the journal bearings of the bracket arm, substantially as set forth.

3. The combination of the bracket arm, the adjustable supporter carried thereby and provided with the hanger portion or downwardly projecting arm, the forked supporter attachment provided with the lug or short arm, the pivot connecting the forked supporter attachment with the hanger portion of the adjustable supporter, the pendent engine arm terminating in forks at its upper end, the pivot connecting said forks with the lug or short arm of the supporter attachment, and the guide pulleys rotating about a pin secured to the engine arm, substantially as and for the purpose set forth.

In testimony whereof I affix my signature in presence of two witnesses.

ARTHUR W. BROWNE.

Witnesses:
SEYMOUR CASE,
ED. K. HUBBARD.